(12) United States Patent
Saiga (10) Patent No.: US 11,641,380 B2
(45) Date of Patent: May 2, 2023

(54) CALL CONTROL SYSTEM, TERMINAL DEVICE, CALL CONTROL APPARATUS, METHOD AND PROGRAM

(71) Applicant: Nippon Telegraph and Telephone Corporation, Tokyo (JP)

(72) Inventor: Masaru Saiga, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/612,247

(22) PCT Filed: May 21, 2019

(86) PCT No.: PCT/JP2019/020082
§ 371 (c)(1),
(2) Date: Nov. 18, 2021

(87) PCT Pub. No.: WO2020/234992
PCT Pub. Date: Nov. 26, 2020

(65) Prior Publication Data
US 2022/0150283 A1    May 12, 2022

(51) Int. Cl.
*H04L 65/1046* (2022.01)
*H04L 65/1069* (2022.01)
*H04L 65/1104* (2022.01)

(52) U.S. Cl.
CPC ...... *H04L 65/1046* (2013.01); *H04L 65/1069* (2013.01); *H04L 65/1104* (2022.05)

(58) Field of Classification Search
CPC ............. H04L 65/1046; H04L 65/1104; H04L 65/1069
(Continued)

(56) References Cited

U.S. PATENT DOCUMENTS

2009/0042538 A1    2/2009   Cho et al.
2009/0135736 A1*   5/2009   Lin .................... H04L 12/4633
                                                              370/254
(Continued)

OTHER PUBLICATIONS

3gpp.org, "3rd Generation Partnership Project; Technical Specification Group Core Network and Terminals; Inter-IMS Network to Network Interface (NNI)," 3GPP TS 29.165, V15.6.0 (Dec. 2018) Release 15, Dec. 2018, retrieved from URL <http://www.3gpp.org/ftp//Specs/archive/29_series/29.165/29165-f60.zip>, 149 pages.

(Continued)

*Primary Examiner* — Glenford J Madamba
(74) *Attorney, Agent, or Firm* — Fish & Richardson P.C.

(57) ABSTRACT

A terminal device 1 collects RTP information related to a call and transmits the RTP information to a CSCF 3. The CSCF 3 collects, from a plurality of SIP packets related to the call, the address of an edge router 2 that has handled the plurality of SIP packets, the address of an SBC 4 that has handled the plurality of SIP packets, and the domain name of an operator's network 5 that has handled the plurality of SIP packets, and stores in a call information list, for each call, the collected information in association with the RTP information transmitted from the terminal device 1. Then, the CSCF 3 identifies a plurality of problem-occurring calls using the RTP information, and determines a faulty portion based on a bias in the quantitative trend of the count of each of the edge router 2 addresses, the count of each of the SBC 4 addresses, and the count of each of the operator's network 5 domains.

4 Claims, 8 Drawing Sheets

(58) Field of Classification Search
USPC .......................................................... 709/228
See application file for complete search history.

(56) References Cited

U.S. PATENT DOCUMENTS

| | | | |
|---|---|---|---|
| 2011/0034157 A1* | 2/2011 | Walker | H04L 69/40 |
| | | | 455/417 |
| 2013/0242775 A1* | 9/2013 | Taylor | H04L 45/306 |
| | | | 370/252 |
| 2015/0236915 A1* | 8/2015 | Mohammed | H04L 41/0893 |
| | | | 709/223 |

OTHER PUBLICATIONS

Rosenberg et al., "SIP: Session Initiation Protocol," Network Working Group RFC3261, Jun. 2002, retrieved from URL <http://www.rfc-editor.org/pdfrfc/rfc3261.txt.pdf>, 269 pages.

Schulzrinne et al., "RTP: A Transport Protocol for Real-Time Applications," Network Working Group, RFC3550, Jul. 2003, retrieved from URL <http://www.rfc-editor.org/rfc/rfc3550.pdf>, 89 pages.

Telecommunication Technology Committee, "Common interconnection interface between IMS operator's networks," TTC Standard, JJ-90.30, Edition 5.0, Aug. 29, 2018, retrieved from URL <http://www.ttc.or.jp/jp/document_list/pdf/j/STD/JJ-90.30v5.pdf>, 279 pages (with English translation).

* cited by examiner

| COMMUNICATION START TIME | COMMUNICATION END TIME | EDGE ROUTER ADDRESS | DESTINATION ADDRESS | OPERATOR DOMAIN | RTP INFORMATION |
|---|---|---|---|---|---|
| | | | | | |

Fig. 6

```
BYE sip : [IP ADDRESS] : 5060 SIP/2.0
Via : SIP/2.0/UDP [IP ADDRESS] : 5060 ; branch=z9hG4bKaaaa
Max-Forwards : bb
To : <sip : OABJ@ [DOMAIN NAME] ; user=phone> ; tag=ccc
From : <sip : oABJ@ [IP ADDRESS] ; user=phone> ; tag=ddd
Call-ID : eee@ [IP ADDRESS]
CSeq : 1 BYE
RTP status: RECEIVED RTP PACKET COUNT, PACKET LOSS COUNT, JITTER, MAXIMUM PACKET TRANSMISSION/RECEIPT TIME INTERVAL
Content-Length : 0
```

Fig. 7

Fig. 8

CALL CONTROL SYSTEM, TERMINAL DEVICE, CALL CONTROL APPARATUS, METHOD AND PROGRAM

CROSS-REFERENCE TO RELATED APPLICATIONS

This application is a National Stage application under 35 U.S.C. § 371 of International Application No. PCT/JP2019/020082, having an International Filing Date of May 21, 2019, the disclosure of which is considered part of the disclosure of this application, and is incorporated in its entirety into this application.

TECHNICAL FIELD

The present invention relates to a technology for estimating a faulty portion in a call control system.

BACKGROUND ART

Figure 8:
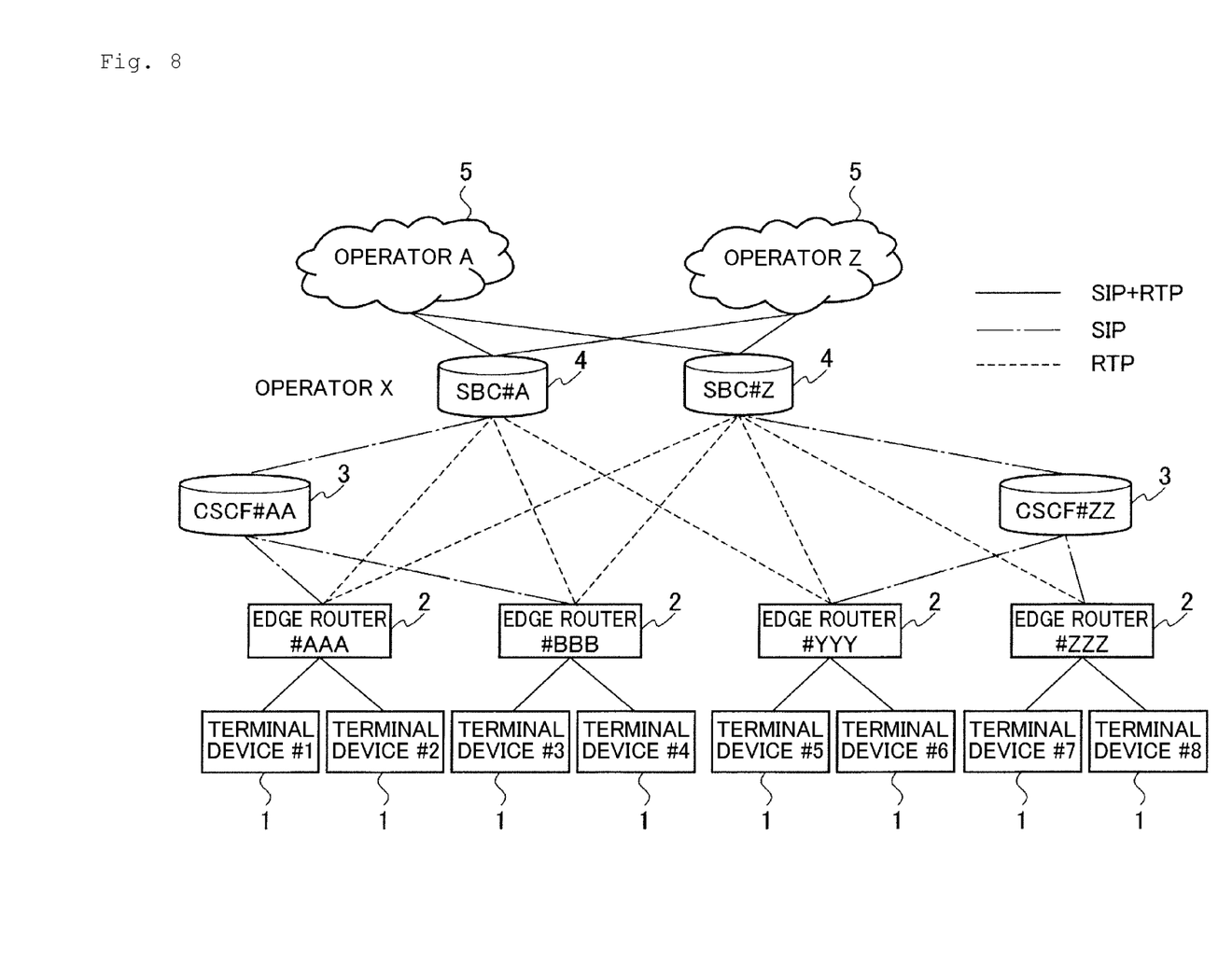
FIG. 8 is a diagram illustrating an example of the configuration of a conventional call control system.

FIG. 8 is a diagram illustrating an example of the configuration of a call control system.

When a terminal device (#1) 1 of an operator X makes a phone call to a terminal device of an operator (A)'s network 5, the terminal device (#1) 1 transmits SIP (Session Initiation Protocol) packets for call control to a CSCF (#AA) 3 via an edge router (#AAA) 2. The CSCF (#AA) 3 forwards the received SIP packets to the operator (A)'s network 5 of the called party via an SBC (#A) 4. The operator (A)'s network 5 also has a similar call control system, and a CSCF of the operator (A)'s network 5 forwards the SIP packets received from the operator X to the terminal device of the called party.

After that, when a call connection is established between the terminal device (#1) 1 of the calling party and the terminal device of the called party, SIP packets are transmitted and received via the CSCF (#AA) 3, and RTP (Real-time Transport Protocol) packets for audio media are transmitted and received directly between the edge router (#AAA) 2 and the SBC (#A) 4 without going through the CSCF (#AA) 3.

In addition, when a terminal device (#3) 1 of the operator X makes a phone call to a terminal device of another operator (Z)'s network 5 as well, SIP packets and RTP packets are transmitted and received via an edge router 2, a CSCF 3, an SBC 4, and an operator's network 5 that constitute the call control system.

CITATION LIST

Non Patent Literature

NPL 1: "Common Interconnection Interface between IMS Operator's Networks", the TTC standards, JJ-90.30, Ver. 5.0, the Telecommunication Technology Committee, Aug. 29, 2018, [searched on May 13, 2019], Internet <URL: http://www.ttc.or.jp/jp/document_list/pdf/j/STD/JJ-90.30v5.pdf>

NPL 2: "Inter-IMS Network to Network Interface (NNI)", 3GPP TS 29.165, V15.6.0 (2018-12), Release 15, [searched on May 13, 2019], Internet <URL: http://www.3gpp.org/ftp//Specs/archive/29_series/29.165/29165-f60.zip>

NPL 3: "SIP: Session Initiation Protocol", IETF, RFC 3261, [searched on May 13, 2019], Internet <URL: http://www.rfc-editor .org/pdfrfc/rfc3261.txt.pdf>

NPL 4: "RIP: A Transport Protocol for Real-Time Applications", IETF, RFC 3550, [searched on May 13, 2019], Internet <http://www.rfc-editor.org/rfc/rfc3550.pdf>

SUMMARY OF THE INVENTION

Technical Problem

As described above, a call control system is constituted by a plurality of devices and networks, such as terminal devices 1, edge routers 2, CSCFs 3, SBCs 4, and operator's networks 5. Therefore, if a problem event, such as interrupted audio on a terminal device, occurs, it is extremely difficult to identify a faulty portion that causes the problem event. When a problem event is occurring, isolation of the cause of a failure can be more or less easily performed. However, when the occurrence of the problem event cannot be clearly observed, or in the case of an intermittent failure, the operator needs to perform operations of acquiring IP packets from terminal devices and narrowing down the suspected portions, and identification of the faulty portion thus takes much time. For this reason, there is a problem in that it is difficult to quickly solve an audio trouble, such as an intermittent failure.

The present invention was made with the foregoing circumstances in view, and it is an object thereof to easily estimate a faulty portion in a call control system.

Means for Solving the Problem

To achieve the above-described object, a call control system of the present invention is a call control system including a terminal device configured to transmit a signal of a call to another terminal device, and a call control device configured to control the call between the terminal device and the other terminal device, the terminal device including: an RTP status monitoring unit configured to collect information about RTP packets related to the call; and a call processing unit configured to transmit the information about the RTP packets to the call control device in a state in which the information about the RTP packets is contained in call disconnection SIP packets related to the call, and the call control device including: a call information collecting unit configured to collect, from a plurality of SIP packets related to the call that are transmitted and received between the terminal device and the other terminal device, identification information of a plurality of devices and networks through which the plurality of SIP packets are routed, also acquire the information about the RTP packets from the call disconnection SIP packets, and store identification information groups related to the plurality of pieces of identification information that have been collected and the information about the RTP packets in association with each other in a storage unit, for each call; a problem-occurring call extracting unit configured to identify a problem-occurring call using the information about the RTP packets, and extract, from the storage unit, a plurality of identification information groups corresponding to a plurality of calls communicating in the same time slot as the problem-occurring call; and a faulty portion determining unit configured to determine a faulty portion based on a bias in a quantitative trend of each of the devices, or each of the networks, using the plurality of identification information groups.

Also, a terminal device of the present invention is a terminal device configured to transmit a signal of a call to another terminal device, the terminal device including: an RTP status monitoring unit configured to collect information about RTP packets related to the call; and a call processing unit configured to transmit the information about the RTP packets to the call control device in a state in which the information about the RTP packets is contained in call disconnection SIP packets related to the call.

Also, a call control device of the present invention is a call control device configured to control a call between a terminal device and another terminal device, the call control device including: a call information collecting unit configured to collect, from a plurality of SIP packets related to the call that are transmitted and received between the terminal device and the other terminal device, identification information of a plurality of devices and networks through which the plurality of SIP packets are routed, also acquire information about RTP packets related to the call from call disconnection SIP packets transmitted from the terminal device, and store identification information groups related to the plurality of pieces of identification information that have been collected and the information about the RTP packets in association with each other in a storage unit, for each call; a problem-occurring call extracting unit configured to identify a problem-occurring call using the information about the RTP packets, and extract, from the storage unit, a plurality of identification information groups corresponding to a plurality of calls communicating in the same time slot as the problem-occurring call; and a faulty portion determining unit configured to determine a faulty portion based on a bias in a quantitative trend of each of the devices, or each of the networks, using the plurality of identification information groups.

Also, a call control method of the present invention is a call control method that is performed by a terminal device configured to transmit a signal of a call to another terminal device and a call control device configured to control the call between the terminal device and the other terminal device, the terminal device performing the steps of: collecting information about RTP packets related to the call; and transmitting the information about the RTP packets to the call control device in a state in which the information about the RTP packets is contained in call disconnection SIP packets related to the call, and the call control device performing the steps of: collecting, from a plurality of SIP packets related to the call that are transmitted and received between the terminal device and the other terminal device, identification information of a plurality of devices and networks through which the plurality of SIP packets are routed, also acquiring the information about the RTP packets from the call disconnection SIP packets, and storing identification information groups related to the plurality of pieces of identification information that have been collected and the information about the RTP packets in association with each other in a storage unit, for each call; identifying a problem-occurring call using the information about the RTP packets, and extracting, from the storage unit, a plurality of identification information groups corresponding to a plurality of calls communicating in the same time slot as the problem-occurring call; and determining a faulty portion based on a bias in a quantitative trend of each of the devices, or each of the networks, using the plurality of identification information groups.

Also, a call control program of the present invention causes a computer to execute the above-described call control method.

Effects of the Invention

According to the present invention, it is possible to easily estimate a faulty portion in a call control system.

DESCRIPTION OF EMBODIMENTS

Hereinafter, an embodiment of the present invention will be described with reference to the drawings.

System Configuration

Figure 1:
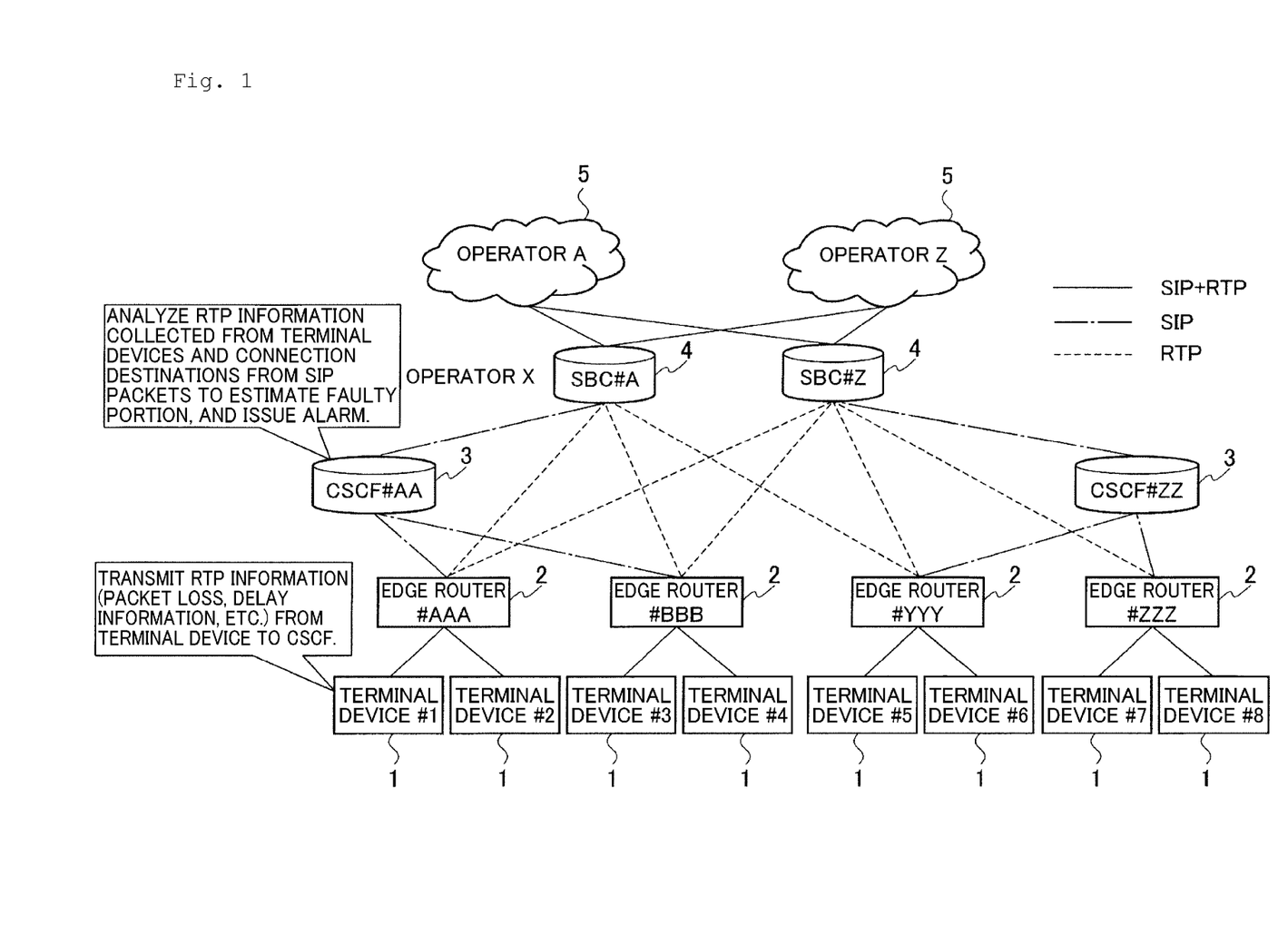
FIG. 1 is a diagram illustrating an example of the configuration of a call control system according to an embodiment of the present invention.

FIG. 1 is a diagram illustrating an example of the configuration of a call control system according to the present embodiment. As is the conventional call control system illustrated in FIG. 8, this call control system is constituted by a plurality of devices and networks. For example, the call control system includes a plurality of terminal devices 1, a plurality of edge routers 2, a plurality of CSCFs 3, SBCs 4, and a plurality of operator's networks 5. Each terminal device 1 transmits a call signal to a predetermined terminal device according to a phone call request from a user. Each edge router 2 forwards a call signal transmitted from a calling-party terminal device 1 to a predetermined CSCF 3. Each CSCF 3 controls a call signal between a calling-party terminal device 1 and a called-party terminal device. Each SBC 4 forwards a call signal from an operator's network 5 to another operator's network 5. The term "CSCF" is an abbreviation for Call Session Control Function, and refers to a so-called call control device. The term "SBC" is an abbreviation for Session Border Controller.

In the present embodiment, in order to easily estimate a faulty portion (faulty device or faulty network) in the call control system, each terminal device 1 collects information (e.g., packet loss count and the like) about RTP packets related to a call, and transmits the collected information to a CSCF 3. The CSCF 3 collects, from SIP packets related to the call, identification information of a plurality of devices or networks that have handled the SIP packets (through which the SIP packets have been routed), and stores, for each call, the identification information in association with the information about the RTP packets transmitted from the terminal device 1. Furthermore, the CSCF 3 identifies a plurality of calls having problems using the information about the RTP packets, determines a faulty portion based on a bias in the quantitative trend of each of the devices, or each of the networks, and issues an alarm.

First, functions of each terminal device 1 according to the present embodiment will be described.

Figure 2:
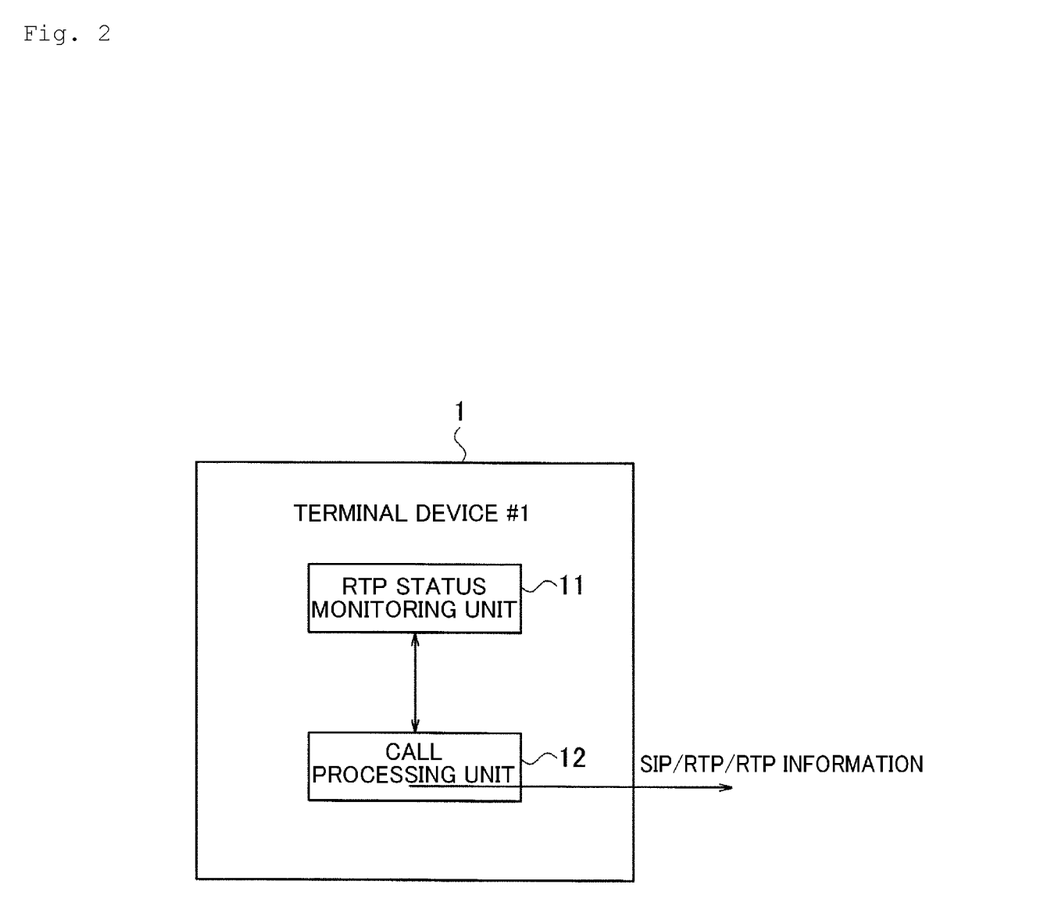
FIG. 2 is a diagram illustrating an example of the configuration of functional blocks of a terminal device according to the present embodiment.

FIG. 2 is a diagram illustrating an example of the configuration of functional blocks of a terminal device 1 according to the present embodiment. The terminal device 1 mainly includes an RTP status monitoring unit 11 and a call processing unit 12.

The RTP status monitoring unit 11 has a function of collecting information about RTP packets related to calls of call signals transmitted to other terminal devices. The information about RTP packets (hereinafter referred to as the "RTP information") includes, for example, received RIP packet count, packet loss count, jitter, maximum packet transmission/receipt time interval, and the like.

The call processing unit 12 has, in addition to an existing function of transmitting call signals (SIP packets, RTP packets) to other terminal devices, a function of transmitting the above-described RTP information to the SCSF 3 in a state in which the RTP information is contained in call disconnection SIP packets related to the calls of the call signals. The "call disconnection SIP packets" means, for example, a call disconnection signal (BYE signal).

Next, functions of each CSCF 3 according to the present embodiment will be described.

Figure 3:
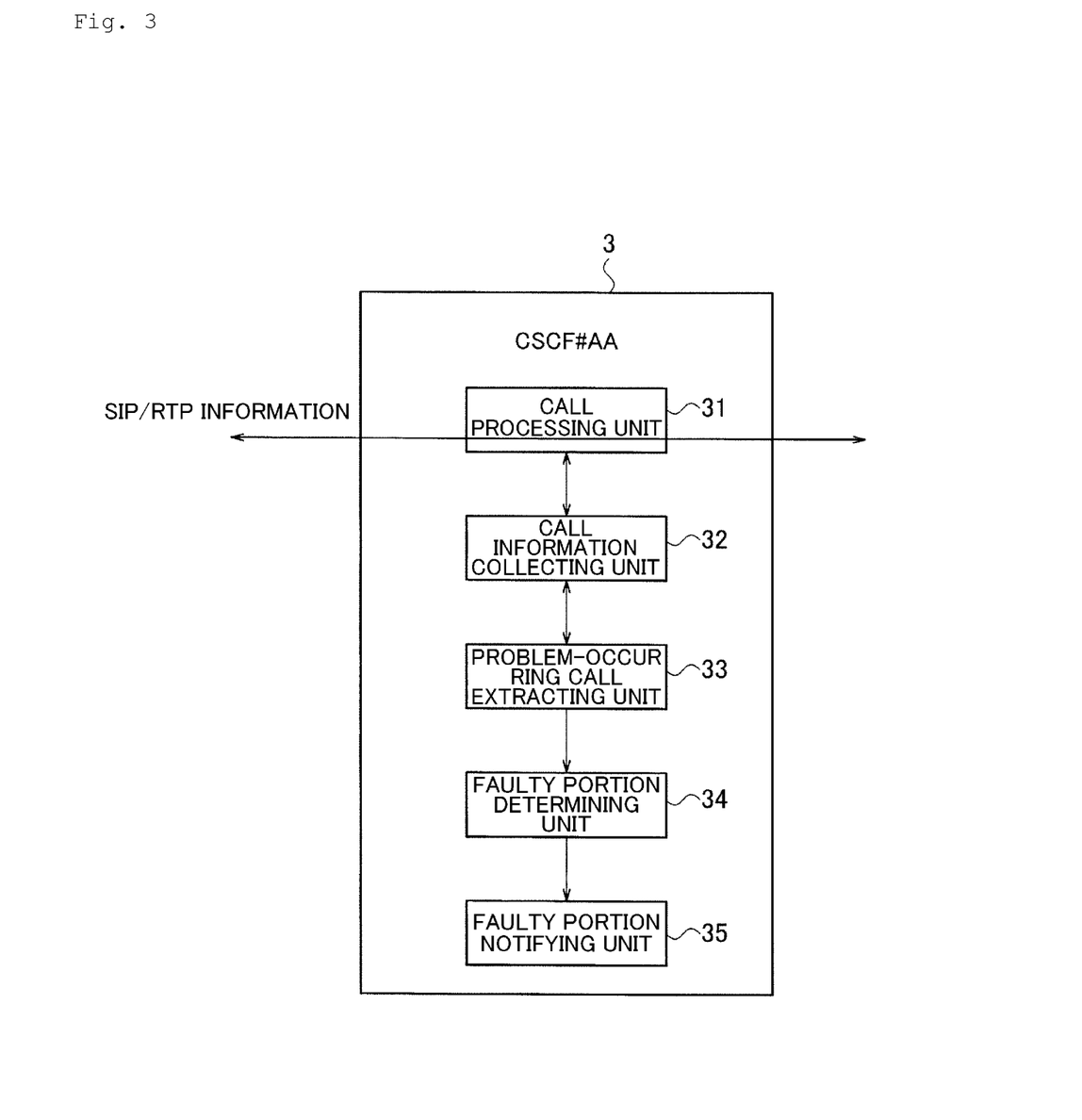
FIG. 3 is a diagram illustrating an example of the configuration of functional blocks of a CSCF according to the present embodiment.

FIG. 3 is a diagram illustrating an example of the configuration of functional blocks of a CSCF 3 according to the present embodiment. The SCSF 3 mainly includes a call processing unit 31, a call information collecting unit 32, a problem-occurring call extracting unit 33, a faulty portion determining unit 34, and a faulty portion notifying unit 35.

The call processing unit 31 has a function of processing call signals (SIP packets) from terminal devices 1.

The call information collecting unit 32 collects, from a plurality of SIP packets related to calls of call signals transmitted and received between a terminal device 1 and other terminal devices, identification information of a plurality of devices and networks through which the plurality of SIP packets have been routed. Furthermore, the call information collecting unit 32 has a function of acquiring the RTP information from the above-described call disconnection SIP packets, and storing identification information groups related to the plurality of pieces of identification information that have been collected and the RTP information in association with each other in a database (storage unit), for each call.

The problem-occurring call extracting unit 33 identifies a problem-occurring call using the RTP information, and extracting, from the above-described database, a plurality of identification information groups corresponding to a plurality of calls communicating in the same time slot as the problem-occurring call and in predetermined time slots before and after this time slot.

The faulty portion determining unit 34 has a function of determining a faulty portion based on a bias in the quantitative trend of each of the devices, or each of the networks, using the plurality of identification information groups that have been extracted. The "faulty portion" may be, for example, a specific operator's network 5, a specific SBC 4, a specific edge router 2, common equipment behind an edge router, or a terminal device 1.

The faulty portion notifying unit 35 has a function of notifying a predetermined device of the determined faulty portion. The "predetermined device" may be, for example, an OPS (Operation System) server for managing, monitoring, maintaining, and operating an operator's network.

The configuration of the call control system and the functions of the terminal devices 1 and the CSCFs 3 according to the present embodiment have been heretofore described. The terminal devices 1 and the CSCFs 3 can be implemented by computers each including a CPU, a memory, an input/output interface, a communication interface, and the like. Moreover, a program for causing computers to function as the terminal devices 1 and the CSCFs 3, as well as a storage medium containing the program can also be created.

System Operation

Next, a call control method performed by the above-described call control system will be described.

Figure 4:
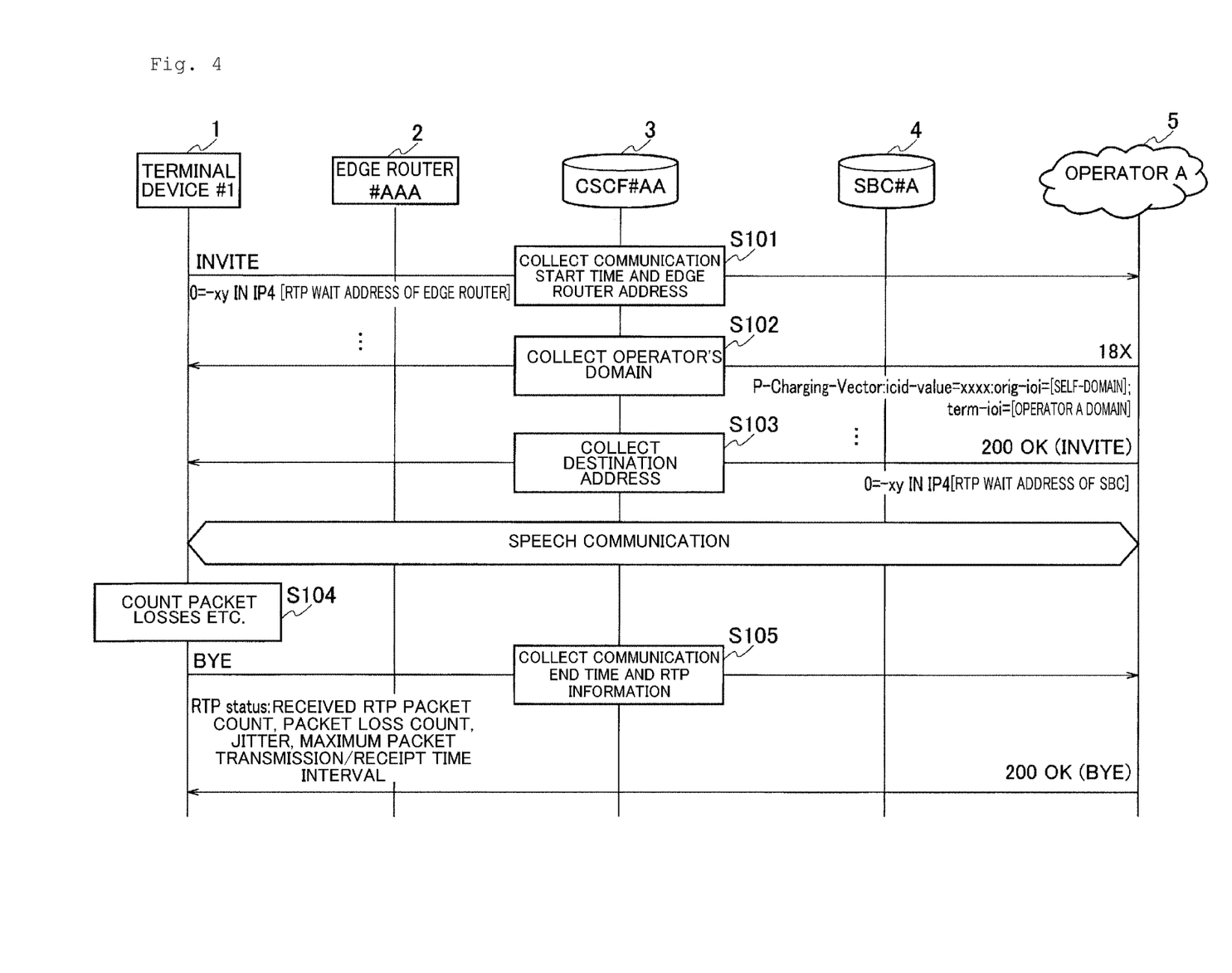
FIG. 4 illustrates a processing sequence for generating a call information list.

First, processing for generating a call information list that is used to determine a faulty portion will be described with reference to FIG. 4.

Step S101

Figure 5:
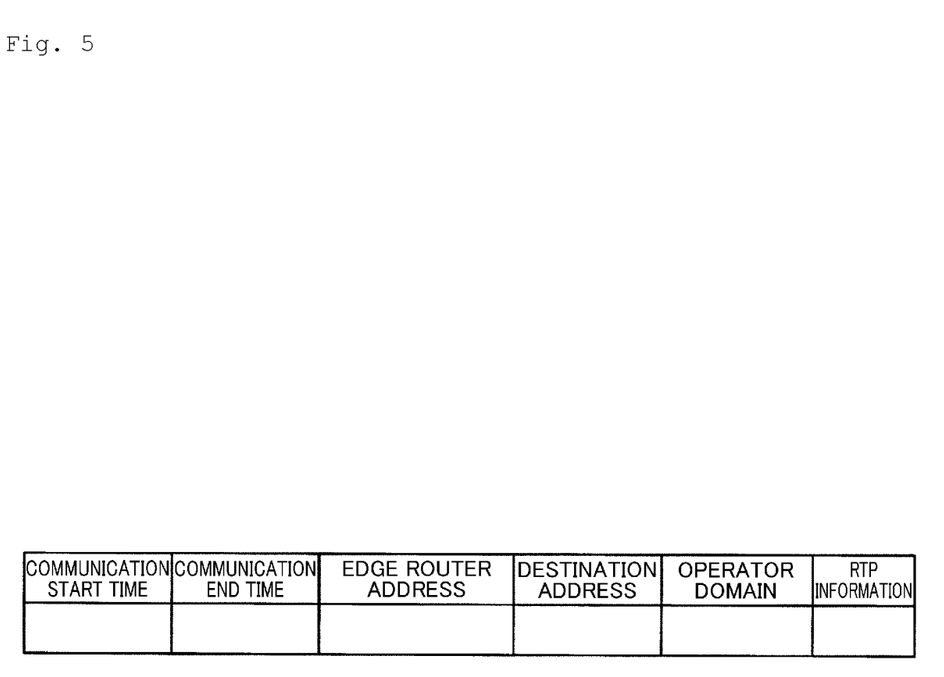
FIG. 5 illustrates an example of the call information list.

First, when the call processing unit 31 of the CSCF (#AA) 3 receives an INVITE signal from the terminal device (#1) 1 to a terminal device (hereinafter referred to "the other terminal device") of the operator (A)'s network 5, the call information collecting unit 32 collects time information (timestamp) from the INVITE signal, and also collects the address of the edge router (#AAA) 2 from "o=−xy IN IP4 [RTP wait address of edge router]" contained in the INVITE signal, and stores the time information and the address in a call information list within the database. FIG. 5 illustrates an example of the call information list. The call information collecting unit 32 stores the collected time information in the "COMMUNICATION START TIME" field and the collected address of the edge router (#AAA) 2 in the "EDGE ROUTER ADDRESS" field.

Step S102

Next, when the call processing unit 31 of the CSCF (#AA) 3 receives an 18× response signal to the INVITE signal from the other terminal device, the call information collecting unit 32 collects the domain name of the operator (A)'s network 5 from "P-Charging-Vector: icid-value=xxxx;orig-ioi=[self-domain]; term-ioi=[operator A domain]" contained in the response signal, and stores the domain name in the "OPERATOR DOMAIN" field of the call information list.

Step S103

Next, when the call processing unit 31 of the CSCF (#AA) 3 receives a 200 OK response signal from the other terminal device, the call information collecting unit 32 collects the address of the SBC (#A) 4 from "o=−xy IN IP4 [RIP wait address of SBC]" contained in the response signal, and stores the address in the "DESTINATION ADDRESS" field of the call information list.

Step S104

Next, after a speech communication state is established between the terminal device (190 1) 1 and the other terminal device, the RTP status monitoring unit 11 of the terminal device (#1) 1 monitors the condition in which RTP packets are received and transmitted, and collects the RTP packet information. For example, the RTP status monitoring unit 11 counts the number of received RTP packets and, furthermore, counts the number of lost packets based on the continuity of numbers from the sequence numbers in the RTP packets. In addition, the RTP status monitoring unit 11 calculates a jitter of the RTP packets and, furthermore, calculates the maximum value of the RTP packet receipt time interval.

Figure 6:
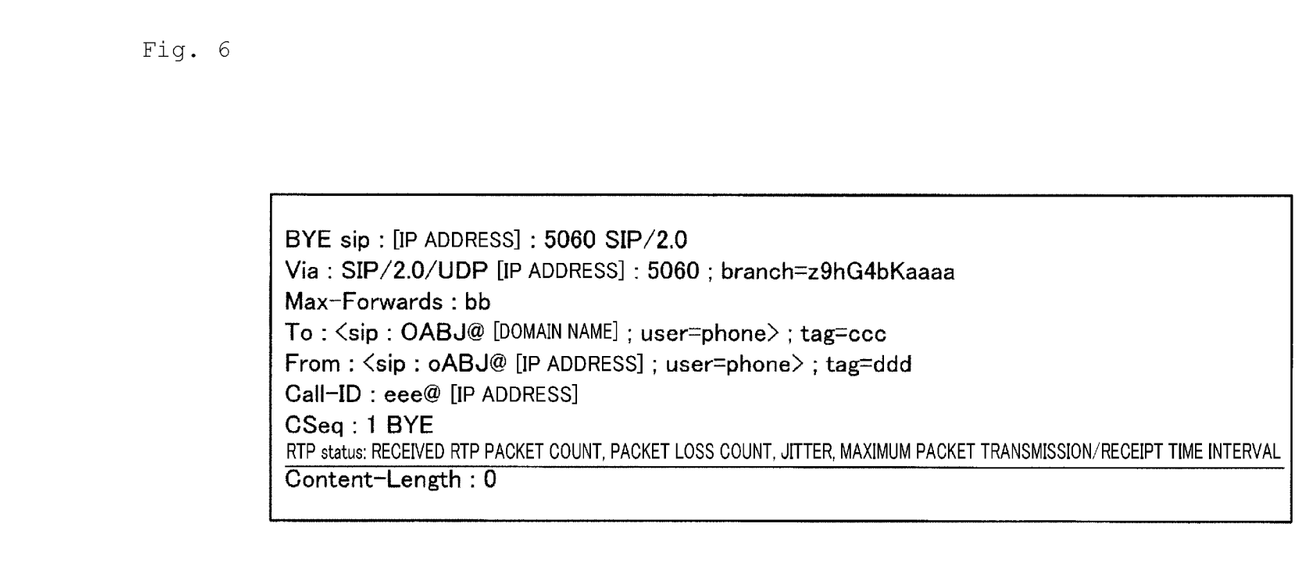
FIG. 6 illustrates an example of a BYE signal.

After that, the call processing unit 12 sets the collected RTP information (received RTP packet count, packet loss count, jitter, maximum packet transmission/receipt time interval, and the like) in a BYE signal, and transmits the BYE signal to the CSCF (#AA) 3. FIG. 6 illustrates an example of the BYE signal. The RTP information is set by adding the "RTP status" field to an existing BYE signal.

Step S105

Finally, when the call processing unit 31 of the CSCF (#AA) 3 receives the BYE signal from the terminal device (#1) 1, the call information collecting unit 32 collects the time information (timestamp) and the RTP information from the BYE signal, and stores the time information and the RTP information in the "COMMUNICATION END TIME" field and the "RTP INFORMATION" field, respectively, of the call information list.

The plurality of terminal devices 1 and the plurality of CSCFs 3 illustrated in FIG. 1 execute the above-described steps S101 to S105 with respect to all the calls performed in the call control system.

Note that, in the present embodiment, assuming that the terminal device (#1) 1 disconnects the call, a case where the RTP information is set in the BYE signal in step S104 is described as an example; however, in the case where the other terminal device, which is the called party, disconnects the call and transmits a BYE signal, the terminal device (#1) 1 may set the RTP information in a 200 OK response signal (200 OK BYE signal) to the BYE signal.

Also, in view of the possibility that the set information of SIP signals will be changed in the future, various kinds of information collected in steps S101 to S103 and S105 may be collected from SIP signals other than the above-described types.

Furthermore, in view of the possibility that various devices constituting the call control system will be added in the future, identification information of devices or networks other than the edge routers 2, the CSCFs 3, the SBCs 4, and the operator's networks 5 may also be stored in the call information list.

Figure 7:
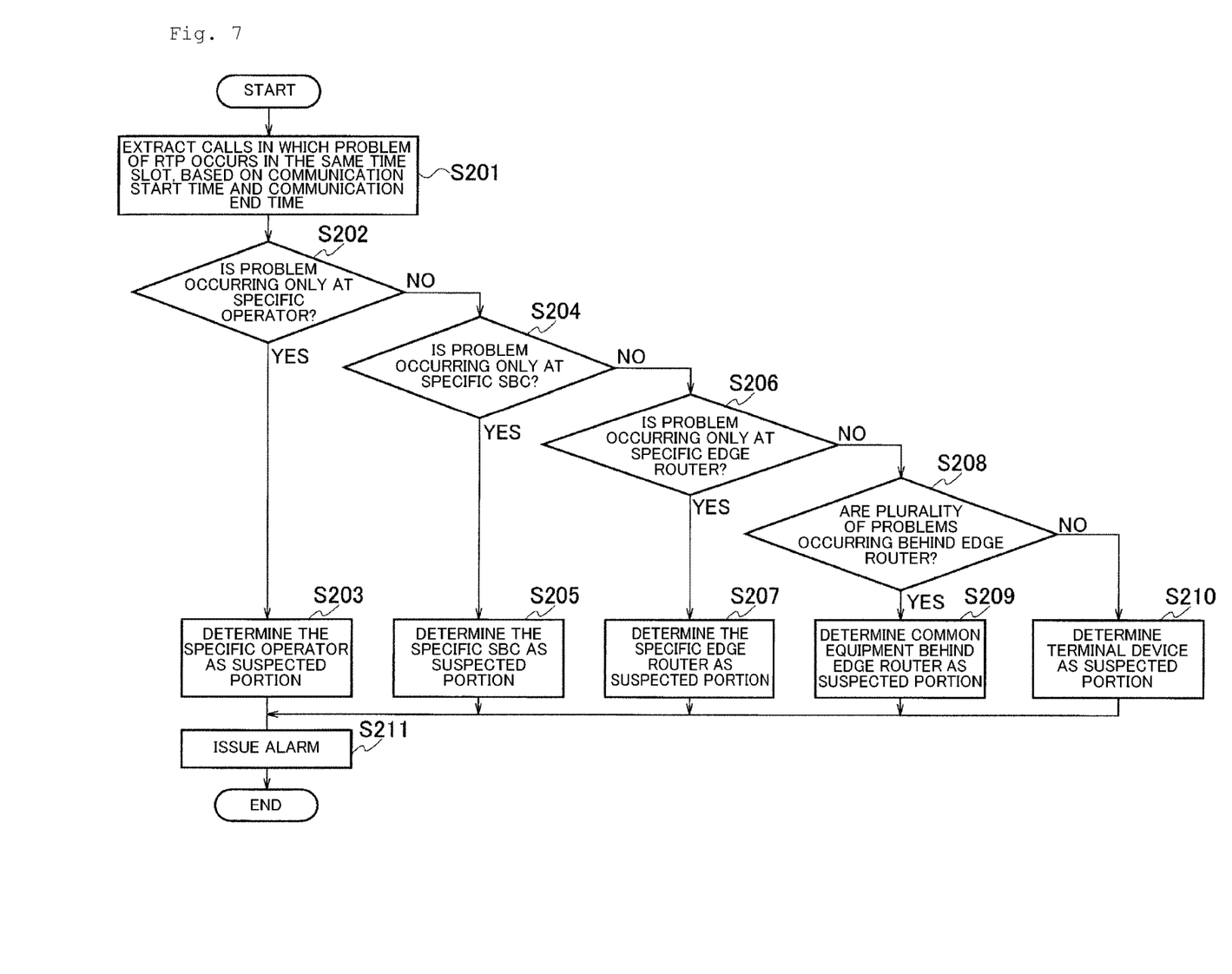
FIG. 7 illustrates a processing flow for determining a faulty portion.

Next, processing for determining a faulty portion will be described with reference to FIG. 7.

Step S201

First, the problem-occurring call extracting unit 33 of the CSCF (#AA) 3 references the call information list in the database, and identifies a problem-occurring call using the RTP information. Since the RIP information includes received RIP packet count, packet loss count, jitter, maximum packet transmission/receipt time interval, and the like, the problem-occurring call extracting unit 33 identifies the problem-occurring call in a predetermined manner using such pieces of information.

For example, the problem-occurring call extracting unit 33 identifies a call with a packet loss count exceeding a predetermined number (threshold value A) as being a problem-occurring call. In addition, the problem-occurring call extracting unit 33 calculates a packet loss rate by dividing the packet loss count by the total value of the received RTP packet count and the packet loss count, and identifies a call with a packet loss rate exceeding a predetermined rate (threshold value B) as being a problem-occurring call. If there is a call with a maximum packet transmission/receipt time interval exceeding a predetermined packet time interval (in voice communications, the interval is normally 20 ms) (threshold value C), the problem-occurring call extracting unit 33 determines that a delay is occurring, and identifies this call as being a problem-occurring call. If there is a call with a jitter value exceeding a predetermined value (threshold value D), the problem-occurring call extracting unit 33 determines that a delay is occurring, and identifies this call as being a problem-occurring call. A problem-occurring call may be identified using one of these pieces of information alone, or may be identified using a combination of these pieces of information.

Then, the problem-occurring call extracting unit 33 extracts, from the above-described call information list, all the calls communicating in the same time slot as the problem-occurring call and time slots before and after this time slot, and thereafter, the faulty portion determining unit 34 estimates a faulty portion by comparing and checking a bias in the quantitative trend of a specific edge router 2, SBC 4, or operator's network 5 among the extracted problem-occurring calls. The bias in the quantitative trend is determined by, for example, calculating, with respect to the problem-occurring calls, the count of each edge router 2 address, the count of each SBC 4 address, and the count of each operator's network 5 domain, and making the determination based on the presence/absence and the magnitude of the counter values. The faulty portion determining unit 34 may also make the determination using other methods.

Steps S202 and S203

First, the faulty portion determining unit 34 determines whether or not the count of a specific operator's network 5 is the highest. If the count of the specific operator's network 5 is the highest, the specific operator's network 5 is determined to be a suspected portion for the problem. If not, the processing proceeds to step S204.

Steps S204 and S205

Subsequently, the faulty portion determining unit 34 determines whether or not the count of a specific SBC 4 is the highest. If the count of the specific SBC 4 is the highest, the specific SBC 4 is determined to be a suspected portion for the problem. If not, the processing proceeds to step S206.

Steps S206 and S207

Subsequently, the faulty portion determining unit 34 determines whether or not the count of a specific edge router 2 is the highest. If the count of the specific edge router 2 is the highest, the specific edge router 2 is determined to be as a suspected portion for the problem. If not, the processing proceeds to step S208.

Steps S208 to S210

Subsequently, for example, if the operator's network 5 counts, the SBC 4 counts, and the edge router 2 counts are extremely low, or if there is no difference in the counts, the faulty portion determining unit 34 determines whether or not the edge router 2 addresses corresponding to the plurality of problem-occurring calls are identical. If it is determined that those edge router 2 addresses are identical, it is conceivable that a plurality of suspected portions are behind the same edge router, and therefore, the faulty portion determining unit 34 determines that common equipment (e.g., a router shared in an apartment building, or the like) behind the same edge router is a suspected portion for the problem. If it is determined that the edge router 2 addresses are not identical, the faulty portion determining unit 34 determines that individual terminal devices 1 corresponding to the plurality of problem-occurring calls are suspected portions for the problem.

Step S211

Finally, the faulty portion notifying unit 35 notifies the OPS server of the suspected portion for the problem that has been determined in step S203, S205, S207, S209, or S210.

Effects of the Embodiment

According to the present embodiment, a terminal device 1 collects RTP information related to a call and transmits the RTP information to a CSCF 3. The CSCF 3 collects, from a plurality of SIP packets related to the call, the address of an edge router 2 that has handled the plurality of SIP packets, the address of an SBC 4 that has handled the plurality of SIP packets, and the domain name of an operator's network 5 that has handled the plurality of SIP packets, and stores in a call information list, for each call, the collected information in association with the RTP information transmitted from the terminal device 1. Then, the CSCF 3 identifies a plurality of problem-occurring calls using such RTP information, and determines a faulty portion based on a bias in the quantitative trend of the count of each of the edge router 2 addresses, the count of each of the SBC 4 addresses, and the count of each of the operator's network 5 domains. Therefore, it is possible to easily estimate a suspected portion that is conceivable as a faulty portion in the call control system, and also it is possible to quickly deal with the problem before being notified of the occurrence of a failure. Specifically, fault isolation of terminal devices, edge routers, CSCFs, and the like and isolation of networks of one's own company and other companies can be easily performed, and maintenance operations can be reduced.

REFERENCE SIGNS LIST

1 Terminal device
2 Edge router
3 CSCF (Call Session Control Function)
4 SBC (Session Border Controller)
5 Operator's network
11 RTP status monitoring unit
12 Call processing unit
31 Call processing unit
32 Call information collecting unit
33 Problem-occurring call extracting unit
34 Faulty portion determining unit
35 Faulty portion notifying unit

The invention claimed is:

1. A call control system including a terminal device for transmitting a signal of a call to another terminal device, and a call control device for controlling the call between the terminal device and the other terminal device,
the terminal device comprising:
one or more first processors; and
one or more first storage devices storing instructions that when executed by the one or more first processors, cause the one or more first processors to perform operations comprising:
collecting information about RTP packets related to the call; and
transmitting the information about the RTP packets to the call control device in a state in which the information about the RTP packets is contained in call disconnection SIP packets related to the call, and the call control device comprising:
one or more second processors; and
one or more second storage devices storing instructions that when executed by the one or more second processors, cause the one or more second processors to perform operations comprising:
collecting, from a plurality of SIP packets related to the call that are transmitted and received between the terminal device and the other terminal device, identification information of a plurality of devices and networks through which the plurality of SIP packets are routed, acquiring the information about the RTP packets from the call disconnection SIP packets, and storing identification information groups related to the plurality of pieces of identification information that have been collected and the information about the RTP packets in association with each other in a storage unit, for each call;
identifying a problem-occurring call using the information about the RTP packets, and extracting, from the storage unit, a plurality of identification information groups corresponding to a plurality of calls communicating in the same time slot as the problem-occurring call; and
determining a faulty portion based on a bias in a quantitative trend of each of the devices, or each of the networks, using the plurality of identification information groups.

2. A call control device for controlling a call between a terminal device and another terminal device, the call control device comprising:
one or more processors; and
one or more storage devices storing instructions that when executed by the one or more processors, cause the one or more processors to perform operations comprising:
collecting, from a plurality of SIP packets related to the call that are transmitted and received between the terminal device and the other terminal device, identification information of a plurality of devices and networks through which the plurality of SIP packets are routed, acquiring information about RTP packets related to the call from call disconnection SIP packets transmitted from the terminal device, and storing identification information groups related to the plurality of pieces of identification information that have been collected and the information about the RTP packets in association with each other in a storage unit, for each call;
identifying a problem-occurring call using the information about the RTP packets, and extracting, from the storage unit, a plurality of identification information groups corresponding to a plurality of calls communicating in the same time slot as the problem-occurring call; and
determining a faulty portion based on a bias in a quantitative trend of each of the devices, or each of the networks, using the plurality of identification information groups.

3. A call control method that is performed by a terminal device configured to transmit a signal of a call to another terminal device and a call control device configured to control the call between the terminal device and the other terminal device, the terminal device performing the steps of:
- collecting information about RTP packets related to the call; and transmitting the information about the RTP packets to the call control device in a state in which the information about the RTP packets is contained in call disconnection SIP packets related to the call, and the call control device performing the steps of:
- collecting, from a plurality of SIP packets related to the call that are transmitted and received between the terminal device and the other terminal device, identification information of a plurality of devices and networks through which the plurality of SIP packets are routed, also acquiring the information about the RTP packets from the call disconnection SIP packets, and storing identification information groups related to the plurality of pieces of identification information that have been collected and the information about the RTP packets in association with each other in a storage unit, for each call;
- identifying a problem-occurring call using the information about the RTP packets, and extracting, from the storage unit, a plurality of identification information groups corresponding to a plurality of calls communicating in the same time slot as the problem-occurring call; and
- determining a faulty portion based on a bias in a quantitative trend of each of the devices, or each of the networks, using the plurality of identification information groups.

4. A non-transitory computer-readable storage medium storing a call control program for causing a computer to execute the call control method according to claim 3.

* * * * *